Figure 1:
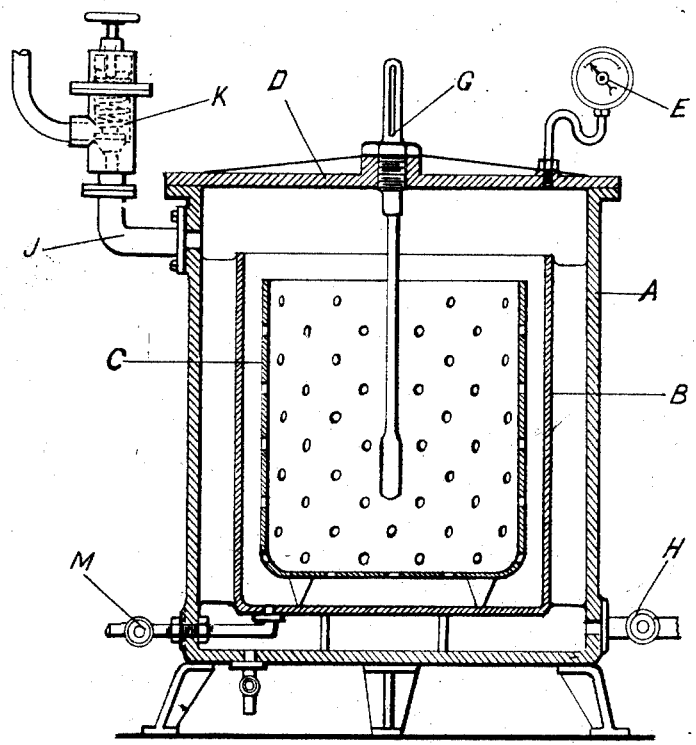

Aug. 6, 1929.  J. W. RICHARDSON ET AL  1,723,710
METHOD OF CANNING MEATS
Filed Nov. 16, 1926

Inventors
James William Richardson
and
Percy Walter Woollett
By B. Singer, Atty.

Patented Aug. 6, 1929.

1,723,710

UNITED STATES PATENT OFFICE.

JAMES WILLIAM RICHARDSON, OF COOGEE, AND PERCY WALTER WOOLLETT, OF MERRYLANDS, NEW SOUTH WALES, AUSTRALIA.

METHOD OF CANNING MEATS.

Application filed November 16, 1926, Serial No. 148,728, and in Australia March 16, 1926.

This invention relates to the canning of either boiled or pickled meats, and its objects are to improve the appearance and enhance the attractiveness of canned meats, eliminate the disagreeable tang or flavour frequently noticeable therein and to render possible the regulation of the proportion of fat remaining in the meat when canned. Another object of the invention is to reduce the time labour and cost involved in canning meats by hitherto known processes.

In canned meat it is frequently observed that portions thereof, particularly the connective tissues, have a dark appearance which detracts from its attractiveness, and it is commonly known that the flavour of canned meat has a more or less noticeable tang which to some people is disagreeable.

It is believed that the said dark appearance and the peculiar tank are due to the presence of metallic sulphides formed by the liberation of certain sulphur compounds from the meat during the cooking process in the can, which compounds combine to a certain extent with the metal or metals of the can which are exposed to their action to form tin, and/or lead, and/or iron sulphides which impregnate portions of the meat.

In the usual method of canning, the meat after being scalded is packed in the can and subjected to a steam heat of about 227° F.— i. e. that of steam at an absolute pressure of about 19.7 lbs. per square inch, or as it is commonly termed "+5 lbs." This temperature is sufficient to liberate the sulphur compounds which re-act as above mentioned. After the can is sealed the contained meat is finally cooked and sterilized by subjecting the can to the heat of steam at a pressure +10 lbs., at which temperature further sulphur compounds are liberated.

Our invention consists in a process including the step of removing from the meat deleterious sulphurous compounds before the meat is placed in the cans for final treatment, said step consisting in subjecting the meat, submerged in a suitable liquid, to the action of flowing steam maintained at sufficient temperature and pressure and for a sufficient period of time to bring about ebullition of the liquid and evolution and liberation of deleterious sulphurous gases or gaseous compounds, and to carry them off, so that in subsequent treatment when the meat is in the cans, the formation of metallic sulphides does not occur or is at least reduced to a minimum.

The ordinary preliminary scalding of the meat is rendered unnecessary and consequently the time and labour entailed thereby is saved.

In carrying out our invention the meat to be treated, after being boned and sliced in the usual way, is placed in a perforated basket or container and immersed in a suitable liquid, in an apparatus of the nature of a meat preservers' retort to which the necessary steam is admitted. The nature of the liquid employed depends upon the product to be produced; if the product is to be canned boiled meat, the fluid is water, but if canned pickled meat is required, the fluid consists of a pickling solution.

Apparatus, or a retort, suitable for carrying out the sulphur compound eliminating process which is the essential part of our invention, is diagrammatically depicted in section in the accompanying drawing, but we do not make any claim to this apparatus which is known in the art.

In the drawing, A is an outer container or retort, B an inner vessel spaced from the container, and C the perforated basket shown in dotted lines. The container A has a removable lid D, and is fitted with a pressure gauge E and a removable thermometer G, the tube of the latter being of sufficient length to extend to about the centre of the basket C. Steam is admitted to the container A through valved pipe H and is exhausted or discharged through pipe J in which is an automatic pressure regulating valve K.

Meat to be treated, after being boned and sliced in the usual way, is placed in the basket C and the latter immersed in the liquid (water or pickling solution) contained in the vessel B in sufficient quantity to cover the meat. The cover D is then secured on the container A and steam is admitted through pipe H to establish in the container a pressure of about +10 lbs. and a temperature of about 238° F. This pressure and temperature are maintained by the automatic action of the regulator valve K which is adjusted to provide a continuous outflow of steam, thus creating a current through the whole retort.

The steam surrounds the vessel B and its heat results in violent ebullition of the liquid and the liberation in gaseous form of the sulphur compounds contained in the meat, said gaseous compounds being carried off by the steam. At the same time the pressure and heat of the steam breaks up a proportion of the fat cells in the meat and liberates free fat which rises to the surface of the liquid.

The length of time during which the meat is subjected to this temperature and pressure depends on circumstances, but we find that a period of about 45 minutes is usually sufficient to eliminate the sulphur compounds and to render out a proportion of the fats, but if it is desired to render out a greater proportion of the fats the treatment is continued for a longer period.

It may here be observed that in canning processes as heretofore practised, the maximum temperature to which the meat is subjected before being packed in the cans, is 212° F. which temperature renders out but a small proportion of fats.

After treatment in the manner described, the meat is removed from the apparatus, salted if required, packed in cans and finally cooked and sterilized therein in the usual way. Owing to the previous treatment at comparatively high temperature, the steam employed in the final cooking need not exceed a pressure of +8 lbs.

The resultant liquid is drained out through drain pipe M and may be subsequently treated for the recovery of meat extract and separation of the fat.

What we claim and desire to secure by Letters Patent is:

1. In meat canning, the step of eliminating the sulphur compounds from the meat before the latter is packed in cans, by subjecting it to the action of flowing steam at sufficient temperature to bring about evolution of gaseous sulphurous compounds which are carried off by the flowing steam.

2. In meat canning, the step of eliminating sulphur compounds from the meat before the latter is packed in cans, said step consisting in immersing the meat in liquid and surrounding the liquid with flowing steam at sufficient temperature to bring about ebullition of the liquid and evolution of gaseous sulphur compounds which are carried off by the flowing steam.

3. In meat canning, and prior to the packing of the meat in cans, the step of immersing the meat in liquid in a closed vessel, subjecting the meat while so immersed to the action of flowing steam at a temperature of not less than 235° F. and a pressure of not less than +9 lbs. per square inch, to bring about ebullition of the liquid and evolution from the heat of sulphur compounds in gaseous form which are carried off by the flowing steam.

4. A meat canning process including the following steps:—preliminary preparation of the meat by boning and slicing, subjecting the meat while immersed in liquid to the action of flowing steam at sufficient temperature and for sufficient time to reduce contained sulphur compounds to gaseous form and evolve sulphurous gases which are carried off by the flowing steam, packing the meat in cans, and finally cooking and sterilizing it therein, and sealing the cans.

Signed at Sydney, New South Wales, this thirteenth day of October, A. D. 1926.

JAMES WILLIAM RICHARDSON.
PERCY WALTER WOOLLETT.